United States Patent
Hikazudani et al.

(10) Patent No.: US 9,216,901 B2
(45) Date of Patent: *Dec. 22, 2015

(54) METHOD FOR PREPARING HYDROGEN

(71) Applicants: Hitachi Zosen Corporation, Osaka-shi (JP); Kyoto University, Kyoto-shi (JP)

(72) Inventors: Susumu Hikazudani, Osaka (JP); Atsushi Wakui, Osaka (JP); Masaharu Furutera, Osaka (JP); Hitoshi Oshiro, Osaka (JP); Tetsuya Inoue, Osaka (JP); Kazuyuki Hirao, Kyoto (JP)

(73) Assignees: Hitachi Zosen Corporation, Osaka-shi (JP); Kyoto University, Kyoto-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/387,651

(22) PCT Filed: Jan. 11, 2013

(86) PCT No.: PCT/JP2013/050440
§ 371 (c)(1),
(2) Date: Sep. 24, 2014

(87) PCT Pub. No.: WO2013/145805
PCT Pub. Date: Oct. 3, 2013

(65) Prior Publication Data
US 2015/0078987 A1   Mar. 19, 2015

(30) Foreign Application Priority Data
Mar. 28, 2012   (JP) ................................ 2012-073980

(51) Int. Cl.
*C01B 3/08* (2006.01)
*C01B 3/06* (2006.01)
*C01F 7/16* (2006.01)

(52) U.S. Cl.
CPC . *C01B 3/061* (2013.01); *C01B 3/06* (2013.01); *C01F 7/164* (2013.01); *Y02E 60/324* (2013.01); *Y02E 60/36* (2013.01)

(58) Field of Classification Search
USPC ......................................................... 423/657
See application file for complete search history.

(56) References Cited

U.S. PATENT DOCUMENTS

| 2005/0279279 A1 | 12/2005 | Hosono et al. |
| 2012/0040261 A1 | 2/2012 | Nakanishi et al. |
| 2015/0056130 A1* | 2/2015 | Hikazudani et al. .......... 423/657 |

FOREIGN PATENT DOCUMENTS

| JP | 2003-040602 A | 2/2003 |
| JP | 2006-083009 A | 3/2006 |

(Continued)

OTHER PUBLICATIONS

J.M. Rivas-Mercury et al., "Dehydration of $Ca_3Al_2(SiO_4)_y(Oh)_{4(3-y)}$ ($0<y<0.176$) studied by neutron thermodiffractometry", Journal of the European Ceramic Society, available online Mar. 19, 2008, vol. 28, pp. 1737-1748.

(Continued)

*Primary Examiner* — Jun Li
*Assistant Examiner* — Kenneth Vaden
(74) *Attorney, Agent, or Firm* — Locke Lord LLP

(57) ABSTRACT

One object of the present invention is to provide a method for preparing hydrogen which is able to simply produce hydrogen which is clean energy without using ammonia as used in the background art and which is very high in safety. The method for preparing hydrogen of the present invention is characterized in that hydrogen is generated by introducing mayenite ($Ca_{12}Al_{14}O_{33}$) and calcium hydroxide [$Ca(OH)_2$] into water and allowing them to react with water. Here, it is preferable that a temperature of water is from 50 to 100° C., and a molar ratio of mayenite to calcium hydroxide is 1/9.

2 Claims, 2 Drawing Sheets

(56) References Cited

FOREIGN PATENT DOCUMENTS

| JP | 2010-241647 A | 10/2010 |
| JP | 2013-006734 A | 1/2013 |
| WO | WO-03/089373 A | 10/2003 |
| WO | WO-2011/005114 A1 | 1/2011 |

OTHER PUBLICATIONS

Katsuro Hayashi, "Heavy doping of $H^-$ ion in $12CaO \cdot 7Al_2O_3$", Journal of Solid State Chemistry, 2011, vol. 184, pp. 1428-1432.
International Search Report mailed Feb. 12, 2013, issued for PCT/JP2013/050440.

* cited by examiner

METHOD FOR PREPARING HYDROGEN

TECHNICAL FIELD

The present invention relates to a method for preparing hydrogen.

CROSS REFERENCE TO RELATED APPLICATIONS

This application is related to co-pending application: "CONTINUOUS PRODUCTION METHOD OF HYDROGEN" filed even date herewith in the names of Susumu HIKAZUDANI, Atsushi WAKUI, Masaharu FURUTERA, Hitoshi OSHIRO, Tetsuya INOUE and Kazuyuki HIRAO as a national phase entry of PCT/JP2013/050442, which application is assigned to the assignee of the present application and is incorporated by reference herein.

BACKGROUND ART

In recent years, a number of proposals of using, as an energy source, hydrogen that is clean energy have been made, and for example, development of automobiles to be driven by a fuel cell using hydrogen as a fuel is conducted. An exhaust gas from a fuel cell using hydrogen as a fuel does not contain nitrogen oxides, particulate matters, carbon dioxide, and the like which are contained in an exhaust gas from an internal combustion engine, and hence, such a fuel cell is watched as a clean power source capable of suppressing environmental pollution and global warming.

However, a volume in storing hydrogen is large, and for example, in a fuel cell for automobile, a supply means of hydrogen that is the fuel is of a problem.

The following Patent Document 1 discloses a method for generating hydrogen by decomposing ammonia or the like and describes an apparatus for generating hydrogen for fuel cell having a decomposer of decomposing a hydrogen source composed of ammonia and/or hydrazine into nitrogen and hydrogen by a catalytic reaction and supplying them into a fuel cell; and furthermore, the following Patent Document 2 describes a hydrogen generating apparatus for efficiently generating hydrogen from ammonia, in which the invention of Patent Document 1 is improved, and a hydrogen generating method.

Meanwhile, miniaturization of a fuel cell per se is demanded, and this is aimed at utilization in place of an AC-De convertor of a charging type secondary cell which is used for mobile phones, PDA (personal digital assistant), digital cameras, notebook personal computers, and the like.

BACKGROUND ART DOCUMENT

Patent Document

Patent Document 1: JP-A-2003-40602
Patent Document 2: JP-A-2010-241647

SUMMARY OF THE INVENTION

Problems to be Solved by the Invention

However, in the conventional method of producing hydrogen by a catalytic reaction of ammonia described in the above-described Patent Documents 1 and 2, ammonia is one of the specified offensive odor substances stipulated in the Offensive Odor Control Law and is also designated as a deleterious substance in the Poisonous and Deleterious Substances Control Law, and therefore, there was involved such a problem that handling of ammonia is very troublesome.

An object of the present invention is to solve the above-described problem of the background art and to provide a method for preparing hydrogen which is able to simply produce hydrogen which is clean energy without using ammonia as used in the background art and which is very high in safety.

In addition, the object of the present invention is to provide a method for preparing hydrogen which is able to miniaturize a fuel cell per se using hydrogen which is clean energy and which is also applicable to a fuel cell capable of being utilized in place of an AC-DC convertor of a charging type secondary cell which is, for example, used for mobile phones, PDA (personal digital assistant), digital cameras, notebook personal computers, and the like.

Means for Solving the Problem

In order to attain the foregoing object, an invention of a method for preparing hydrogen of claim 1 is characterized in that hydrogen is generated by introducing mayenite ($Ca_{12}Al_{14}O_{33}$) and calcium hydroxide [$Ca(OH)_2$] into water and allowing them to react with water.

An invention of claim 2 is concerned with the method for preparing hydrogen according to claim 1, which is characterized in that a temperature of water is from 50 to 100° C., and a molar ratio of mayenite to calcium hydroxide is 1/9.

Effects of the Invention

The invention of the method for preparing hydrogen of claim 1 is characterized in that hydrogen is generated by introducing mayenite and calcium hydroxide into water and allowing them to react with water, and according to the invention of claim 1, there give rise to such effects that hydrogen which is clean energy can be simply prepared without using ammonia as used in the background art; and that safety is very high.

In addition, according to the method for preparing hydrogen of the present invention, there give rise to such effects that a fuel cell per se using hydrogen which is clean energy can be miniaturized; and that the method for preparing hydrogen of the present invention is also applicable to a fuel cell capable of being utilized in place of an AC-DC convertor of a charging type secondary cell which is, for example, used for mobile phones, PDA (personal digital assistant), digital cameras, notebook personal computers, and the like.

The invention of claim 2 is concerned with the method for preparing hydrogen according to claim 1, which is characterized in that a temperature of water is from 50 to 100° C., and a molar ratio of mayenite to calcium hydroxide is 1/9, and according to the invention of claim 2, there gives rise to such an effect that hydrogen can be efficiently prepared from mayenite and calcium hydroxide.

MODES FOR CARRYING OUT THE INVENTION

Next, embodiments of the present invention are described, but it should not be construed that the present invention is limited thereto.

The method for preparing hydrogen according to the present invention is characterized in that hydrogen is generated by introducing mayenite ($Ca_{12}Al_{14}O_{33}$) and calcium hydroxide [$Ca(OH)_2$] into water and allowing them to react with water.

As described above, when mayenite and calcium hydroxide are introduced into water and allowed to react with water, katoite [$Ca_3Al_2(OH)_{12}$] and hydrogen ($H_2$) are generated according to the following reaction formula.

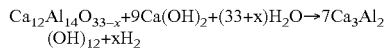

$$Ca_{12}Al_{14}O_{33-x}+9Ca(OH)_2+(33+x)H_2O \rightarrow 7Ca_3Al_2(OH)_{12}+xH_2$$

In the method for preparing hydrogen according to the present invention, it is preferable that a temperature of water is from 50 to 100° C., and a molar ratio of mayenite to calcium hydroxide is 1/9.

Here, when the temperature of water in the method for preparing hydrogen is lower than 50° C., not only a rate of hydrogen generation reaction becomes slow, but the yield becomes poor, and hence, such is not preferable. It is to be noted that in the generation reaction of hydrogen, the temperature of water does not exceed 100° C.

According to the method for preparing hydrogen of the present invention, it is possible to simply produce hydrogen which is clean energy without using ammonia as used in the background art. Then, since both of mayenite and calcium hydroxide are a non-poisonous powdered or granulated substance, they are easy in handling and very high in safety.

In addition, according to the method for preparing hydrogen of the present invention, a fuel cell per se using hydrogen which is clean energy can be miniaturized, and the method for preparing hydrogen of the present invention is also applicable to a fuel cell capable of being utilized in place of an AC-DC convertor of a charging type secondary cell which is, for example, used for mobile phones, PDA (personal digital assistant), digital cameras, notebook personal computers, and the like.

EXAMPLES

Next, the Example of the present invention is described together with the Comparative Examples, but it should not be construed that the present invention is limited to these Examples.

Example 1

Figure 1:
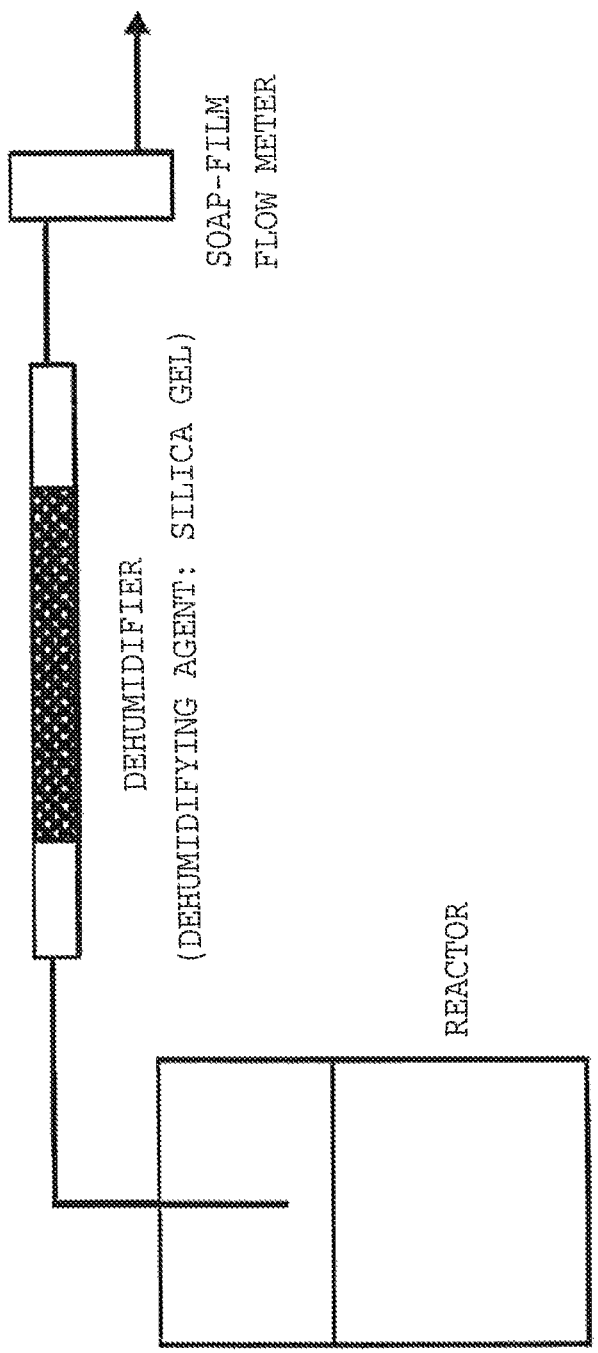
FIG. 1 is a diagrammatic flow sheet showing an example of a testing apparatus for hydrogen production in which the method for preparing hydrogen of the present invention was carried out.

The method for preparing hydrogen according to the present invention was carried out by using a testing apparatus for hydrogen production shown in FIG. 1.

First of all, 200 mL of ion exchange water was charged in a reactor (separable flask) having a capacity of one liter. Subsequently, 9 g of an aluminum powder (a trade name: #150, manufactured by Minalco Ltd.) and 12 g of calcium hydroxide [$Ca(OH)_2$] (manufactured by Wako Pure Chemical Industries, Ltd.) were introduced into the reactor, followed by stirring. After completion of generation of a hydrogen gas, the ion exchange water was removed by filtration, and the remaining solid was dried in air at a temperature of 70° C.

The obtained solid was katoite, and when this was baked in air at a temperature of 300° C. for 2 hours, mayenite ($Ca_{12}Al_{14}O_{33}$) and calcium hydroxide were generated.

Figure 2:
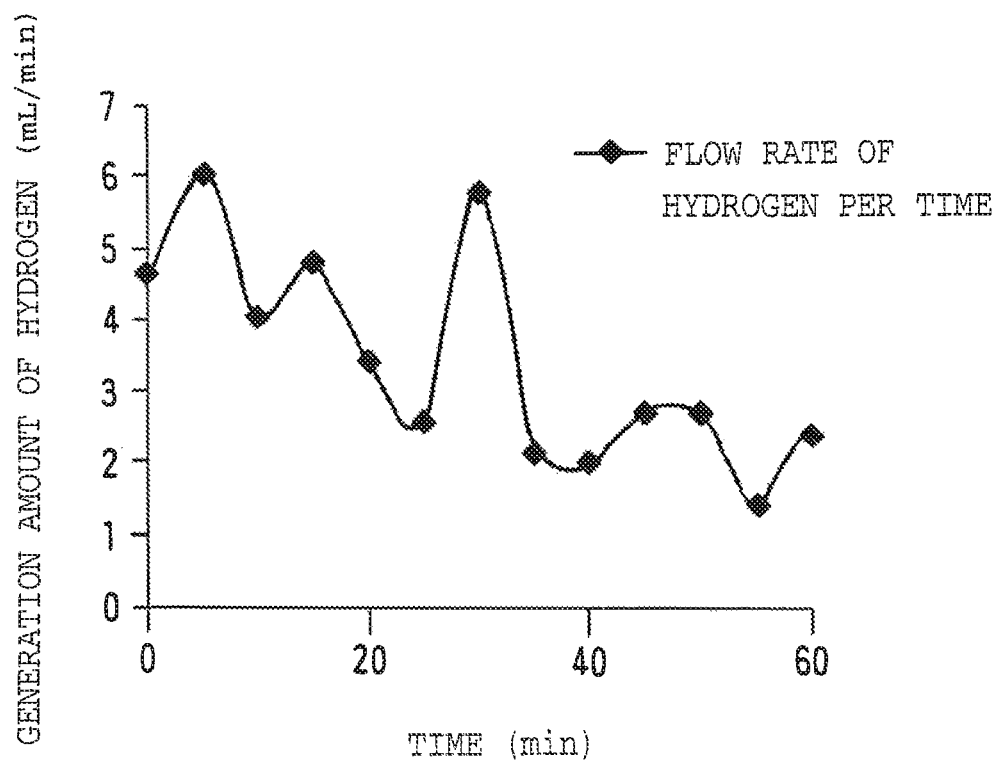
FIG. 2 is a graph showing a change with time of hydrogen generation rate in a hydrogen production test in which the method for preparing hydrogen of the present invention was carried out.

200 mL of ion exchange water was charged in a reactor (separable flask) having a capacity of one liter. Subsequently, 9 g of the above-obtained mixture of mayenite ($Ca_{12}Al_{14}O_{33}$) and calcium hydroxide [$Ca(OH)_2$] (molar ratio: 1/9) was introduced into the reactor, followed by stirring. The temperature was raised to set up a temperature of the ion exchange water to 55° C. The mayenite and calcium hydroxide were allowed to react with water, thereby generating hydrogen. The hydrogen gas was allowed to pass through a dehumidifier filled with a silica gel as a dehumidifying agent to remove water, and a generation amount thereof was then measured by a soap-film flow meter. A component of the generated gas was analyzed by a TCD (thermal conductivity detecter) type gas chromatograph (a trade name: GC-8A, manufactured by Shimadzu Corporation) and confirmed to be hydrogen. It could be confirmed that the hydrogen gas was generated over 60 minutes after the ion exchange water had reached the prescribed temperature. A change with time of hydrogen generation rate in this case is shown in FIG. 2. The generation amount of the hydrogen gas over about 60 minutes was about 300 mL.

Here, when mayenite and calcium hydroxide were introduced into water and allowed to react with water, katoite [$Ca_3Al_2(OH)_{12}$] and hydrogen ($H_2$) were generated according to the following reaction formula.

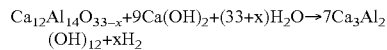

$$Ca_{12}Al_{14}O_{33-x}+9Ca(OH)_2+(33+x)H_2O \rightarrow 7Ca_3Al_2(OH)_{12}+xH_2$$

From this fact, according to the method for preparing hydrogen of the present invention, hydrogen which is clean energy could be simply prepared without using ammonia as used in the background art, and safety was very high. In addition, according to the method for preparing hydrogen of the present invention, it became clear that a fuel cell per Se using hydrogen which is clean energy can be miniaturized, and the method for preparing hydrogen of the present invention is also applicable to a fuel cell capable of being utilized in place of an AC-DC convertor of a charging type secondary cell which is, for example, used for mobile phones, PDA (personal digital assistant), digital cameras, notebook personal computers, and the like.

Comparative Examples 1 and 2

For comparison, the following experiments were conducted. In Comparative Example 1, 200 mL of ion exchange water was charged in the same reactor (separable flask) as that in the case of Example 1, and subsequently, only mayenite was introduced into the reactor. Although the temperature was raised to set up a temperature of the ion exchange water to 55° C., a reaction did not take place, and generation of a hydrogen gas was not confirmed. In addition, in Comparative Example 2, 200 mL of ion exchange water was charged in the same reactor as that in the case of Example 1, and subsequently, only calcium hydroxide was introduced into the reactor. Although the temperature was raised to set up a temperature of the ion exchange water to 55° C., a reaction did not take place, and generation of a hydrogen gas was not confirmed.

The invention claimed is:

1. A method for preparing hydrogen, which is characterized in that hydrogen is generated by introducing mayenite ($Ca_{12}Al_{14}O_{33}$) and calcium hydroxide [$Ca(OH)_2$] into water and allowing them to react with water.

2. The method for preparing hydrogen according to claim 1, which is characterized in that a temperature of water is from 50 to 100° C., and a molar ratio of mayenite to calcium hydroxide is 1/9.

* * * * *